United States Patent [19]

Siino

[11] Patent Number: 4,688,287
[45] Date of Patent: Aug. 25, 1987

[54] WILDERNESS SURVIVAL TOOL

[76] Inventor: Horace J. Siino, 1322 Highway 4, Brentwood, Calif. 94513

[21] Appl. No.: 833,890

[22] Filed: Feb. 27, 1986

[51] Int. Cl.$^4$ ............................................. B25F 1/04
[52] U.S. Cl. .......................................... 7/118; 7/145; 403/248
[58] Field of Search .................. 7/118, 143, 144, 158, 7/145, 146, 147; 30/308.1, 308.2, 308.3, 155, 151; 403/248, 251, 249, 250

[56] References Cited

U.S. PATENT DOCUMENTS

| 203,052 | 4/1878 | Lamb | 7/145 |
|---|---|---|---|
| 292,473 | 1/1884 | Dieterich | 7/144 |
| 660,204 | 10/1900 | Seelye | 7/145 |
| 1,113,844 | 10/1914 | Smith | 7/144 |
| 1,574,232 | 2/1926 | Case | 30/308.1 |
| 1,816,422 | 7/1931 | Coleman | 30/112 |
| 2,105,239 | 1/1938 | Bachtold | 7/144 |
| 2,717,442 | 9/1955 | Smith | 7/145 |
| 2,721,340 | 10/1955 | Shultz | 7/145 |
| 3,187,354 | 6/1965 | Frisbie | 7/158 |
| 3,252,489 | 5/1966 | Huston et al. | 7/145 |
| 3,321,783 | 5/1967 | Ivan | 7/145 |

Primary Examiner—Roscoe V. Parker

[57] ABSTRACT

A survival tool adapted to be mounted on a piece of native wood which is shaped for the purpose by means of the survival tool, the pivotable blade of the survival tool serving as a locking wedge when the survival tool is mounted on a piece of native wood, serving as a helve.

5 Claims, 8 Drawing Figures

WILDERNESS SURVIVAL TOOL

BACKGROUND OF THE INVENTION

1. Field of the Invention

My invention relates to wilderness survival tools for hunters, outdoorsmen, backpackers, and the like, and more particularly to combination tools for hunters, outdoorsmen, backpackers, and the like.

2. Description of the Prior Art

Combination tools for hunters, outdoorsmen, backpackers, and the like, which tools serve the purpose of a plurality of conventional bush tools are known in the prior art, e.g., in U.S. Pat. Nos. 1,113,844; 2,105,239; 2,717,442; 2,721,340; 3,252,489; and 3,321,783. (The term "prior art" as used herein or in any statement made by or on behalf of applicant means *only* that any document or thing referred to as prior art bears, directly or inferentially, a date which is earlier than the effective filing date hereof.)

No representation is made that any of the above-listed patents is part of the prior art, or that a search has been made, or that no more pertinent information exists.

Some of these prior art combination bush tools are undesirably complex, and thus, while they serve the function of several conventional bush tools, are not well adapted to the requirements of the solitary outdoorsman or backpacker who wishes to carry only the most indispensible tools in the lightest and most compact form possible.

Some of these prior art combination bush tools comprise all of the parts of each component conventional tool, and thus do not effect substantial economies of weight or bulk.

In general, these prior art combination bush tools are not adapted to make use of materials available in the field, and thus do not achieve the maximum possible reduction of weight and bulk.

SUMMARY OF THE INVENTION

Accordingly, it is an object of my present invention to provide a novel combination bush tool or wilderness survival tool capable, in combination with readily available native materials, to function as either a clasp knife or an ax.

Another object of my present invention is to provide a wilderness survival tool which is less complex than prior art combination bush tool capable of subserving the same functions.

Yet another object of my present invention is to provide a wilderness survival tool which is lighter and less bulky than prior art wilderness survival tools capable of subserving the same functions.

A further object of my present invention is to provide a combination bush tool capable of subserving the function of a clasp knife and the function of an ax without requiring the outdoorsman or backpacker carrying it to also carry an ax helve or ax handle.

Yet another object of my present invention is to provide a wilderness survival tool in which the blade of the clasp knife serves to lock the helve into the axhead, thus preventing accidents which could be fatal when the wilderness survival tool of the invention is used by a solitary outdoorsman in a remote area.

Another object of my invention is to provide a wilderness survival tool which includes an emergency ax which can be used to quarter big game animals killed in remote areas, or for building lean-tos or other shelters or firewood, should the outdoorsman or backpacker become lost or disoriented.

Other objects of my invention will in part be obvious and will in part appear hereinafter.

My invention, accordingly, comprises the several steps and the relation of one or more steps with respect to each of the others, and the apparatus embodying features of construction, combinations of elements, and arrangements of parts which are adapted to effect such steps, all as exemplified in the following disclosure, and the scope of my invention will be indicated in the appended claims.

In accordance with a principal feature of my invention, a wilderness survival tool is provided the handle of which has a transverse blade at one end which is capable of serving as an ax blade.

In accordance with another principal feature of my invention, a wilderness survival tool is provided which has a transverse blade at one end and a transverse passage intermediate its ends which is adapted to receive an ax helve formed by the user from native materials.

In accordance which yet another principal feature of my invention, the folding blade of said wilderness survival tool passes through said transverse passage when received in the handle of said wilderness survival tool.

In accordance with an additional principal feature of my present invention, said folding blade transects said transverse passage when said folding blade is received in the handle of said wilderness survival tool.

In accordance with an additional principal feature of my present invention, said transverse blade is detachably mounted on the handle of said wilderness survival tool and a pocket is provided in said handle for receiving said transverse blade with its edge contained within said pocket.

In accordance with a still further principal feature of my present invention, at least part of said wilderness survival tool handle is formed from light-weight, impact-resistant material, and at least the cutting edge of said transverse blade is formed from metallic material which is capable of maintaining a sharp cutting edge.

For a fuller understanding of the nature and objects of my present invention, reference should be had to the following detailed description, taken in connection with the accompanying drawings.

DESCRIPTION OF THE PREFERRED EMBODIMENTS

Figure 1:
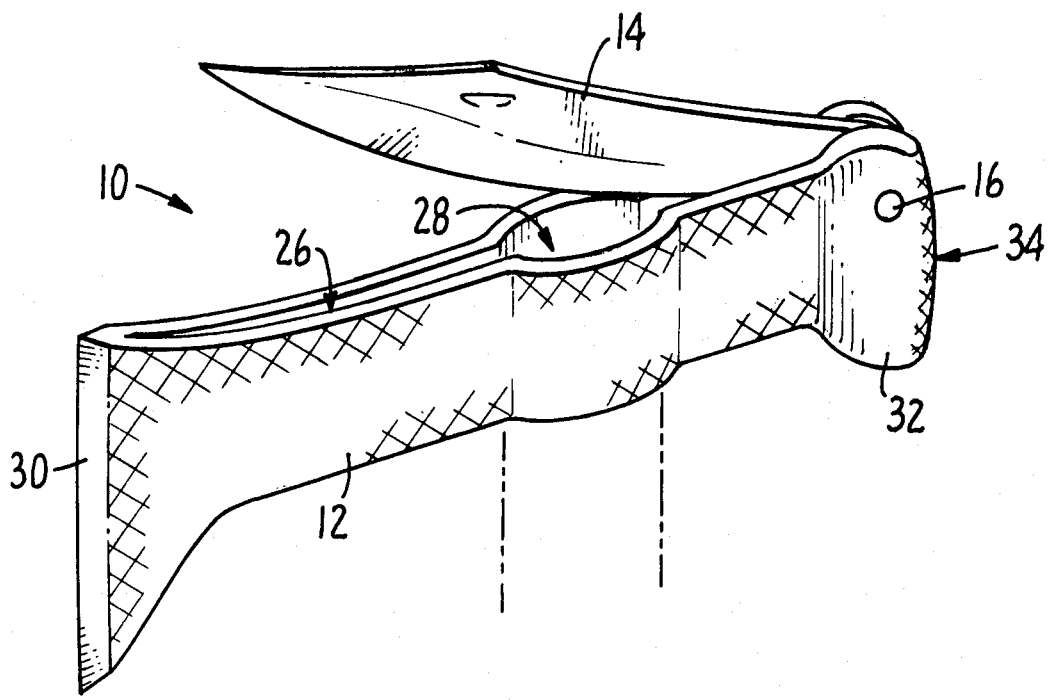
FIG. 1 is a perspective view of a wilderness survival tool embodying my present invention.

Referring now to FIG. 1, there is shown a wilderness survival tool 10 embodying my present invention.

As seen in FIG. 1, wilderness survival tool 10 is principally comprised of a handle 12 and a knife blade 14 which is itself pivotably mounted in one end of handle 12 in the well known manner.

Figure 3:
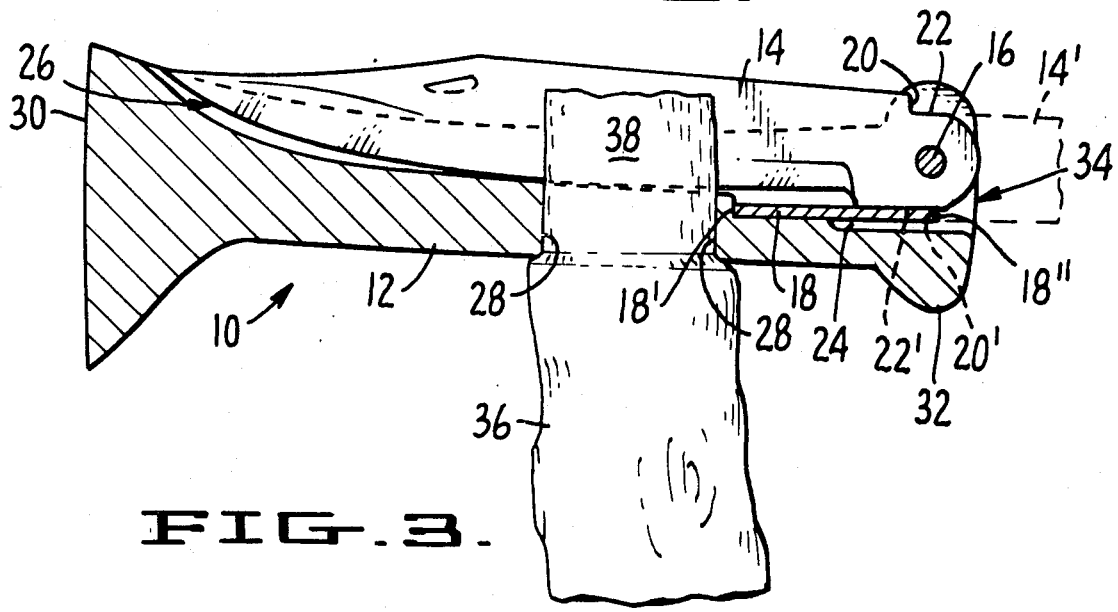
FIG. 3 is an elevational view, partly in section, of the wilderness survival tool of FIGS. 1 and 2, mounted upon an ax helve in accordance with the method of my invention.

As best seen in FIG. 3, knife blade 14 is pivotably mounted on a pivot pin 16 for selective manual pivoting between two extreme positions, i.e., the sheathed or fully retracted position 14 shown in solid lines in FIG. 3 and the fully extended position 14' shown in dashed lines in FIG. 3.

As also seen in FIG. 3, a resilient latching member 18 is provided for locking knife blade 14 in its fully extended position and maintaining knife blade 14 in its sheathed position. In the embodiments of my invention shown and described herein resilient locking member 18 is a heavy cantilever leaf spring which coacts with the shoulder 20 which is a part of the contour of knife blade 14 and the adjacent flat edge portion 22 of the contour of knife blade 14 to lock knife blade 14 in its fully extended or active position. The inner or fixed end 18' of locking member 18 is affixed to the main body portion of handle 12, and a clearance space 24 is provided to permit the outer or cantilever end 18" of locking member 18 to flex slightly when knife blade 14 is manually pivoted from one of its extreme positions to the other. Other well known locking means suitable for locking knife blade 14 in either of its extreme positions will be provided by those having ordinary skill in the art without departing from the scope of my invention.

Figure 2:
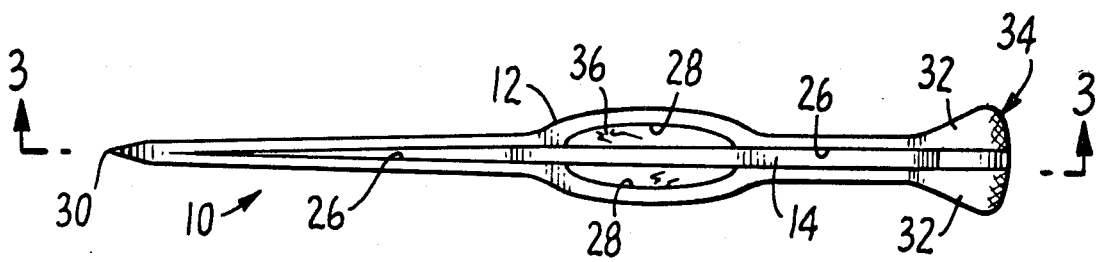
FIG. 2 is a plan view of the wilderness survival tool of my invention shown in FIG. 1 mounted upon an ax helve in accordance with the method of my invention.

As may be seen by comparison of FIGS. 2 and 3, handle 12 also defines a narrow, elongated well 26 which is adapted to receive and close-fittingly embrace knife blade 14 when knife blade 14 is in its sheathed or fully retracted position.

In accordance with a principal feature of my invention, and as may be seen by comparison of FIGS. 1, 2 and 3, handle 12 also defines a transverse passage 28 the axis of symmetry of which lies in the plane of symmetry of well 26.

As best seen by comparison of FIGS. 2 and 3, passage 28 extends completely through handle 12 and is of substantially the same cross-section from end to end. It is to be understood, however, that my invention is not limited in its scope to embodiments in which this transverse passage, sometimes called herein the "helve receiving passage", is of the same cross-section throughout. To the contrary, it is anticipated that helve receiving passage 28 will be slightly tapered in certain embodiments of my invention, e.g., so that the cross-section of the upper end (nearest knife blade 14) is slightly smaller than the cross-section of the lower end (the end remote from knife blade 14). In general, then, it is to be understood that my invention is not limited by the configuration of the helve receiving passage in the handle of the wilderness survival tool of my invention.

It is to be understood, however, to be a principal but not limiting feature of my invention that the blade receiving well dissects the helve receiving passage, as illustrated in FIGS. 1, 2 and 3.

In accordance with a further principal feature of my invention, one end of handle 12 (FIGS. 1, 2 and 3) is provided with an ax blade 30 which extends transversely to the main body portion of handle 14 and in some embodiments is substantially parallel to the principal axis of the helve receiving passage (28).

It is further to be understood that in certain preferred embodiments of my invention only the ax blade portion 30 of handle 12 is formed from ferrous metal, in order to retain a sharp edge which is easily resharpened in the well known manner, and that the remainder of handle 12 in these preferred embodiments is fabricated from light-weight, highly impact-resistant material, whereby the wilderness survival tool of these preferred embodiments of my invention is made as light and easy to carry as possible.

In accordance with yet another feature of my present invention, the end of handle 12 opposite ax blade 30 is provided in the form of a protuberance 32 having a substantially flat outer face 34 which can be used as a hammer or mallet for many purposes which will naturally occur to an outdoorsman equipped with the survival tool 10 of my invention. (The wilderness survival tool of my invention will sometimes hereinafter be called simply the "survival knife" of my invention")

Referring now to FIGS. 2 and 3, the method of employing the survival knife of my invention as an axhead, which method itself constitutes a principal feature of my invention, will now be described.

As seen in FIGS. 2 and 3, a rough piece of native wood 36 such as part of a small tree limb, is shaped at one end to provide a butt 38 which is adapted to be close-fittingly received in helve receiving passage 28 of handle 12. (The said butt portion 38 of said piece of native wood 36 may conveniently be shaped for its intended purpose by means of survival knife 10 of my invention, when blade 14 is in its fully extended position.)

As seen in FIG. 3, butt 38 is preferably of sufficient length so that when the larger, unshaped portion of wooden piece 36 is butted against the lower face of handle 12 it (butt 38) extends completely through handle 12.

In accordance with another feature of my invention, knife blade 14 is pivoted into its fully sheathed position as butt 38 is fully bottomed in helve receiving passage 28, and thus serves to lock butt 38 in passage 28.

In order to contribute to this locking effect, passage 28 may in some embodiments of my invention be tapered in the opposite sense to that described hereinabove, so that the smaller cross-section of passage 28 is at the lower end, remote from knife blade 14.

It is further to be noted that in accordance with these embodiments of my invention the main portion of wooden piece 36 must be slightly smaller in cross-section than passage 28 and butt 38 must be formed to taper slightly outwardly, so that wooden piece 36 may be passed completely through passage 28 except for butt 38, and butt 38 may then be locked into passage 28 by impacting the outer edge of knife blade 14 against a tree hole or the like until it (knife blade 14) is fully received in well 26, as seen in FIG. 3.

As will now be apparent to those having ordinary skill in the outdoorsman's arts, informed by the present disclosure, and particularly FIG. 3, survival tool 10 of my invention when provided with an ax handle or helve 36 in accordance with the method of my invention described above becomes an ax which is fully functional to serve all of the purposes of an ax well known to outdoorsmen. At the same time, it is not necessary for the outdoorsman using the survival tool 10 of my invention to carry an ax helve with him into remote places where he may desire to have a fully functional ax.

Figure 4:
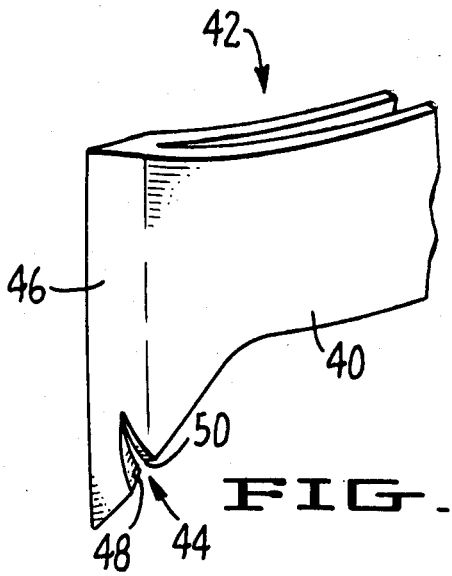
FIG. 4 is a partial perspective view of a wilderness survival tool constructed in accordance with a particular embodiment of my invention.

Referring now to FIG. 4, there is shown a part only of the handle portion 40 of a survival tool 42 of an alternative embodiment of my invention. Handle portion 40 is provided with a notch 44, adjacent to or a part of ax blade 46. Notch 44 is provided with knife edges 48, 50, and thus is convenient for use in trimming twigs, etc., and for other uses which will readily occur to experienced outdoorsmen.

Figure 5:
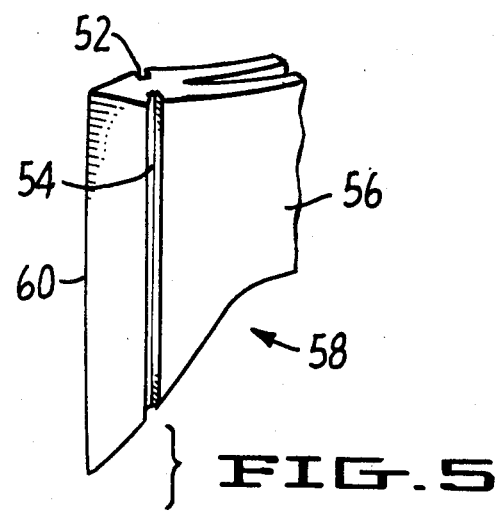
FIG. 5 is a partial perspective view of a wilderness survival tool constructed in accordance with another particular embodiment of my invention.

In yet another preferred embodiment of my invention, illustrated in FIG. 5, two grooves 52, 54 are provided on opposite sides of the handle 56 of a survival tool 58 of my invention, adjacent the ax blade 60. These grooves 52, 54 are adapted to grippingly receive a resilient sheet metal ax blade cover 62, which protects the user when survival tool 58 is being used as a knife, but can readily be removed when survival tool 58 is being used as an ax head.

Figure 6:
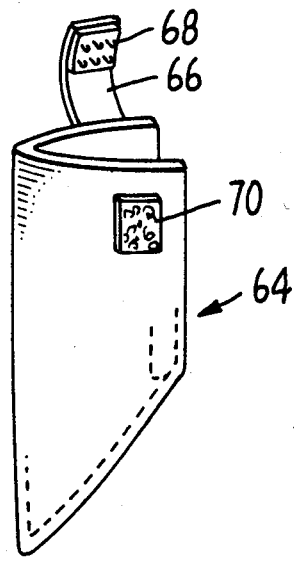
FIG. 6 is a perspective view of a safety cover adapted to cover the ax blade edge portion of the wilderness survival tool of FIG. 4 when that wilderness survival tool is not being used as an axe.

Alternatively, as seen in FIG. 6, a leather or plastic safety cover 64 may be provided, which is equipped with a locking strap 66 and associated woven fasteners 68, 70, such as Velcro fasteners, whereby safety cover 64 can be locked into place over ax blade 46 of the embodiment shown in FIG. 4, or the like.

Figure 7:
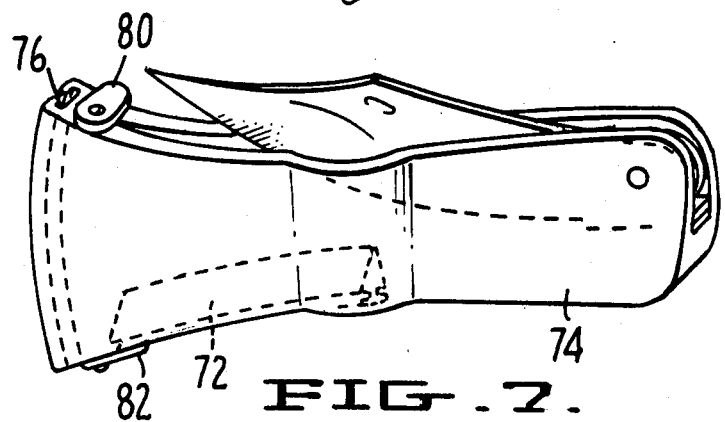
FIG. 7 is a perspective view, partially in phantom, of a wilderness survival tool of my invention constructed in accordance with a second preferred embodiment thereof.
Figure 8:
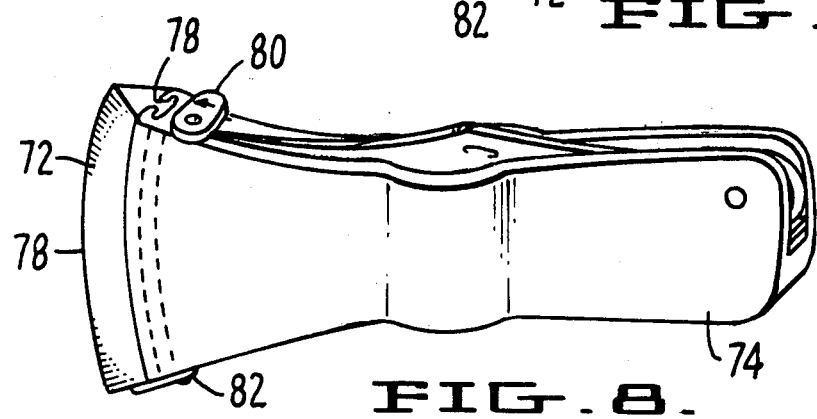
FIG. 8 is a perspective view, partially in phantom, of the wilderness survival tool of my invention as shown in FIG. 7, wherein the detachable cutting edge portion is positioned for use as the edge of an ax blade.

A further embodiment of my present invention, shown in FIGS. 7 and 8, is provided with a removeable ax blade 72 which can be stored in handle 74 in the manner indicated in FIG. 7. As seen in FIG. 7, the ax blade receiving end of handle 74 is provided with a T-shaped groove 76 which is adapted to close-fittingly received T-shaped flange 78, which is integrated with ax blade 76 and remote from the cutting edge 78 thereof. Pivoted latching members 80, 82 are provided for the purpose of locking ax blade 72 in operative position when flange 28 is fully received in groove 76.

It will thus be seen that the objects set forth above, amoung those made apparent from the preceeding description, are efficiently attained, and since certain changes may be made in the above constructions and the method carried out thereby without departing from the scope of my present invention, it is intended that all matter contained in the above description or shown in the accompanying drawings shall be interpreted as illustrative only, and not in a limiting sense.

It is also to be understood that the following claims are intended to cover all the generic and specific features of my invention hereindescribed, and all statements of the scope of my invention which, as a matter of language, might be said to fall therebetween.

What I claim as new and desire to secure by Letters Patent is:

1. A survival tool which comprises:
   (a) a folding knife having a handle and a pivoted knife blade;
   (b) an ax blade located at one end of said folding knife handle;
   (c) a passage in the middle of said folding knife handle enabling said folding knife handle to receive a wood handle;
   (d) said wood handle being a tree limb in an emergency situation and said knife blade when folded onto the knife handle will lock in place the tree limb so that said tree limb acts as the wood handle and provides a means of holding the survival tool for use as an emergency ax.

2. A survival tool comprising a folding knife as claimed in claim 1, in which said ax blade is transverse said one end and said passage is transverse and intermediate its ends.

3. A survival tool as claimed in claim 1 in which said folding knife blade passes through a portion of said transverse passage when received in the folding knife handle.

4. A survival tool as claimed in claim 1, in which said folding knife blade transects the transverse passage when received in said folding knife handle, intersecting said wood handle, thus providing a means of securing the wood handle for use as an emergency ax.

5. A survival tool as claimed in claim 1 in which part of said folding knife handle is formed from non-metallic material.

* * * * *